(12) United States Patent
Xiao et al.

(10) Patent No.: US 11,004,026 B2
(45) Date of Patent: May 11, 2021

(54) METHOD AND APPARATUS FOR DETERMINING RISK MANAGEMENT DECISION-MAKING CRITICAL VALUES

(71) Applicant: ADVANCED NEW TECHNOLOGIES CO., LTD., Grand Cayman (KY)

(72) Inventors: Kai Xiao, Hangzhou (CN); Wenbiao Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/795,387

(22) Filed: Feb. 19, 2020

(65) Prior Publication Data
US 2020/0184393 A1    Jun. 11, 2020

Related U.S. Application Data

(63) Continuation of application No. PCT/CN2018/102751, filed on Aug. 28, 2018.

(30) Foreign Application Priority Data

Nov. 13, 2017  (CN) .......................... 201711115883.0

(51) Int. Cl.
G06Q 10/06    (2012.01)
(52) U.S. Cl.
CPC ..... *G06Q 10/0637* (2013.01); *G06Q 10/0635* (2013.01); *G06Q 10/06393* (2013.01)
(58) Field of Classification Search
None
See application file for complete search history.

(56) References Cited

U.S. PATENT DOCUMENTS

| 6,021,402 A | 2/2000 | Takriti |
| 6,876,992 B1 | 4/2005 | Sullivan |

(Continued)

FOREIGN PATENT DOCUMENTS

| CN | 105989441 A | 10/2016 |
| CN | 107153836 A | 9/2017 |

(Continued)

OTHER PUBLICATIONS

FAIR (Factor Analysis of Information Risk) Basic Risk Assessment Guide, All Content Copyright Risk Management Insight, LLC, downloaded Apr. 24, 2013,11 pages. (Year: 2013).*
An Introduction to Factor Analysis of Information Risk (FAIR), Jack A Jones, info@riskmanagementinsight.com, http://www.riskmanagementinsight.com, Copyright © 2005 Risk Management Insight, LLC, 76 pages. (Year: 2005).*

(Continued)

*Primary Examiner* — Stephanie Z Delich

(57) ABSTRACT

A method for determining critical values includes obtaining N relation functions between M features and N index values, the N relation functions taking the M features as inputs and the N index values as outputs; generating K combinations, each comprising M critical values of the M features; repeating following steps until a preset stop condition is satisfied: determining a score for each of the K combinations based on the N relation functions to represent an overall quality of the N index values; repeatedly selecting two combinations and exchanging critical values between the two combinations to generate two new combinations until a quantity of the new combinations reaches a preset number; and selecting K combinations from the new combinations; and after the preset stop condition is satisfied, associating the M features with the M critical values in a combination with a highest score.

20 Claims, 2 Drawing Sheets

(56) References Cited

U.S. PATENT DOCUMENTS

| | | | |
|---|---|---|---|
| 7,257,566 B2 | 8/2007 | Danielson et al. |
| 7,512,543 B2 | 3/2009 | Raghuraman et al. |
| 7,536,329 B2 | 5/2009 | Goldberg et al. |
| 7,590,937 B2 | 9/2009 | Jacobus et al. |
| 7,747,339 B2 | 6/2010 | Jacobus et al. |
| 7,873,567 B2 | 1/2011 | Eder |
| 7,970,682 B2 | 6/2011 | Roti et al. |
| 8,515,862 B2 | 8/2013 | Zhang et al. |
| 9,811,794 B2 | 11/2017 | Mun |
| 9,836,792 B2 | 12/2017 | Dixon |
| 2010/0114757 A1 | 5/2010 | Jeng et al. |
| 2010/0205108 A1 | 8/2010 | Mun |
| 2014/0324519 A1 | 10/2014 | Dennis et al. |
| 2019/0148008 A1 | 5/2019 | Johnson et al. |

FOREIGN PATENT DOCUMENTS

| | | |
|---|---|---|
| CN | 107240019 A | 10/2017 |
| CN | 107886198 A | 4/2018 |

OTHER PUBLICATIONS

A practical guide to risk assessment*(connectedthinking) How principles-based risk assessment enables organizations to take the right risks, PriceWaterhouseCoopers, Dec. 2008, 40 pages. (Year: 2008).*

Cobit® Focus, Jul. 2008, vol. 3, Applying Cobit With Limited Resources, Matthew Altman, 13 pages. (Year: 2008).*

Leveraging Risk Technology, a large, multifaceted financial-services company develops a Web-based tool to facilitate its risk management efforts, David L. Stone and Dean L. Marotta, the Internal Auditor, Dec. 2003: 60, 6: ABI/ Inform Global, pp. 27-30. (Year: 2003).*

Internation Search Report for Application No. PCT/CN2018/102751, dated Dec. 5, 2018 (5 Pages).

Search Report for European Application No. 18877170.3, dated Jun. 18, 2020, 9 pages.

Written Opinion for Application No. PCT/CN2018/102751, dated Dec. 6, 2018, 8 pages.

International Preliminary Report on Patentability for Application No. PCT/CN2018/102751, dated May 28, 2020, 11 pages.

* cited by examiner

METHOD AND APPARATUS FOR DETERMINING RISK MANAGEMENT DECISION-MAKING CRITICAL VALUES

CROSS REFERENCE TO RELATED APPLICATION

The present application is a continuation application of International Patent Application No. PCT/CN2018/102751, filed on Aug. 28, 2018, which claims priority to Chinese Patent Application No. 201711115883.0, filed on Nov. 13, 2017. The entire content of the above referenced applications is incorporated herein by reference.

TECHNICAL FIELD

The embodiments of the specification relate to the technical field of risk management, and in particular relate to a method and apparatus for determining critical values in a risk management decision-making process.

BACKGROUND ART

Risk identification and decision-making are the two major issues in a risk management system. Risk identification focuses on how to identify potential risks, while decision-making focuses on how to take proper actions according to the identification results.

A quantitative score is usually given for an event at the risk identification stage. Accordingly, the fundamental principle at the decision-making stage is as follows: if the identified risk is high, strong intervention measures are taken, and if the identified risk is low, weak intervention measures are taken. However, an objective criterion is required to determine whether a risk is a high or low. That is, one or more decision-making critical values need to be determined in practical applications. In a traditional solution, these critical values are manually determined based on experience, and the manually determined critical values cannot comprehensively reflect the requirements in many aspects in a complicated risk management system.

SUMMARY OF THE INVENTION

The embodiments of the specification provide a method and apparatus for determining critical values in a risk management decision-making process for the above-mentioned technical problem. The technical solution of the specification is as follows:

A method for determining critical values in a risk management decision-making process may comprise: obtaining N relation functions between M features and N index values, wherein: each of the N index values corresponds to one of the N relation functions; and each of the N relation functions takes one or more of the M features as input, and one of the N index values as output; generating a set P comprising K combinations, each combination comprising M critical values of the M features, K being a preset value; cyclically executing a sequence of optimizing instructions until a preset stop condition is satisfied, the sequence of optimizing instructions comprising: determining K scores respectively for the K combinations based on the N relation functions, wherein each score represents an overall quality of the N index values corresponding to the combination associated with the each score, and is positively correlated to positive index values of the N index values and negatively correlated to negative index values of the N index values; selecting, a highest score from the determined K scores; retrieving, from a memory, a stored highest score from last cycle; determining whether a difference between the selected highest score and the stored highest score from last cycle is below a preset threshold; if the difference is below the preset threshold, terminating the cyclically executing the sequence of optimizing instructions; storing the highest score into the memory; repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations; and when the cyclically executing the sequence of optimizing instructions is terminated, reconfiguring the risk management system by respectively associating the M features of the risk management system with the M critical values in a combination with a highest score in the set P.

In some embodiments, the obtaining N relation functions between M features and N index values comprises: obtaining a plurality of correspondences comprising critical values of the M features and the N index values from historical data; and training the N relation functions between the M features and the N index values based on the plurality of correspondence.

In some embodiments, the determining K scores respectively for the K combinations based on the N relation functions comprises: calculating each score by ($\Sigma$ the positive index values of the corresponding N index values-$\Sigma$ the negative index values of the corresponding N index values), wherein $\Sigma$ represents a summation operation.

In some embodiments, the determining K scores for the K combinations based on the N relation functions further comprises, for each of the K scores: generating N random correction factors for the corresponding N index values; and calculating the score based on the N random correction factors and the corresponding N index values.

In some embodiments, the probability for each of the K combinations being selected from the set P is determined by: obtaining a summation of the scores of the K combinations in the set P; and determining a ratio of the score of each of the K combinations to the summation of the scores as the probability of the each combination being selected.

In some embodiments, the selecting two combinations from the set P and exchanging one or more critical values between the two combinations to generate two new combinations comprises: after exchanging one or more critical values between the two combinations, randomly correcting the two exchanged combinations to generate the two new combinations.

In some embodiments, the updating the set P according to the new combinations comprises: sorting the new combinations by the corresponding scores; and selecting K of the new combinations having the highest scores to form a new set P.

In some embodiments, the updating the set P according to the new combinations further comprises: merging the K combinations in the set P and the new combinations in the updated set P; sorting the merged combinations by the corresponding scores; and selecting K of the merged combinations having the highest scores to form a new set P.

In some embodiments, the preset stop condition comprises: a preset number of repetition is reached; a highest score in the set P satisfies a preset condition of convergence (e.g., the difference between the highest score from previous cycle and the highest score from the current cycle is below a preset threshold); or the N index values corresponding to each of the combinations in the set P satisfy preset requirements.

A system for determining critical values in risk management may comprise one or more processors and one or more non-transitory computer-readable memories coupled to the one or more processors and configured with instructions executable by the one or more processors to cause the system to perform operations comprising: obtaining N relation functions between M features and N index values, wherein: each of the N index values corresponds to one of the N relation functions; and each of the N relation functions takes one or more of the M features as input, and one of the N index values as output; generating a set P comprising K combinations, each combination comprising M critical values of the M features, K being a preset value; cyclically executing a sequence of optimizing instructions until a preset stop condition is satisfied, the sequence of optimizing instructions comprising: determining K scores respectively for the K combinations based on the N relation functions, wherein each score represents an overall quality of the N index values corresponding to the combination associated with the each score, and is positively correlated to positive index values of the N index values and negatively correlated to negative index values of the N index values; selecting, a highest score from the determined K scores; retrieving, from a memory, a stored highest score from last cycle; determining whether a difference between the selected highest score and the stored highest score from last cycle is below a preset threshold; if the difference is below the preset threshold, terminating the cyclically executing the sequence of optimizing instructions; storing the highest score into the memory; repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations; and when the cyclically executing the sequence of optimizing instructions is terminated, reconfiguring the risk management system by respectively associating the M features of the risk management system with the M critical values in a combination with a highest score in the set P.

A non-transitory computer-readable storage medium for determining critical values in risk management, the storage medium may be configured with instructions executable by one or more processors to cause the one or more processors to perform operations comprising: obtaining N relation functions between M features and N index values, wherein: each of the N index values corresponds to one of the N relation functions; and each of the N relation functions takes one or more of the M features as input, and one of the N index values as output; generating a set P comprising K combinations, each combination comprising M critical values of the M features, K being a preset value; cyclically executing a sequence of optimizing instructions until a preset stop condition is satisfied, the sequence of optimizing instructions comprising: determining K scores respectively for the K combinations based on the N relation functions, wherein each score represents an overall quality of the N index values corresponding to the combination associated with the each score, and is positively correlated to positive index values of the N index values and negatively correlated to negative index values of the N index values; selecting, a highest score from the determined K scores; retrieving, from a memory, a stored highest score from last cycle; determining whether a difference between the selected highest score and the stored highest score from last cycle is below a preset threshold; if the difference is below the preset threshold, terminating the cyclically executing the sequence of optimizing instructions; storing the highest score into the memory; repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations; and when the cyclically executing the sequence of optimizing instructions is terminated, reconfiguring the risk management system by respectively associating the M features of the risk management system with the M critical values in a combination with a highest score in the set P.

In the technical solution provided in the embodiments of the specification, for a multi-critical-value and multi-target-value risk management system, a plurality of combinations of critical values are generated through an initialization, then new combinations are continuously generated by exchanging the elements between combinations, bad combinations are eliminated, good combinations are kept, and best combinations are obtained through a plurality of iterations. Since each iteration follows the principle of the survival of the fittest, the best combinations may be found at a high efficiency.

The general description above and the detailed description below are only exemplary and explanatory, and do not limit the embodiments of the specification.

BRIEF DESCRIPTION OF THE DRAWINGS

To describe the embodiments of the specification or the technical solution in the existing solutions more clearly, the following briefly describes the drawings required in the description of the embodiments or the existing solutions. Obviously, the drawings in the following description are only some embodiments of the specification. Those skilled in the art may obtain other drawings on the basis of these drawings.

DETAILED DESCRIPTION OF THE INVENTION

The following describes in detail the technical solution in the embodiments of the specification in combination with the drawings in the embodiments of the specification. Obviously, the embodiments described are only a part, but not all of the embodiments of the specification. All other embodiments obtained by those skilled in the art on the basis of the embodiments of the specification should fall within the scope of protection of the specification.

For example, in order to avoid or reduce fund losses of customers in a financial risk management scenario, the risk management system usually assesses the risk of a fund transfer event before the a fund is transferred out of an account and determines whether to take some actions according to the assessment result, such as, requiring the customer to enter the payment password (relative to password-free payment), requiring the customer to enter the verification code received by a mobile phone, or even intercepting the transaction or freezing the account.

Since a plurality of features considered at the time of a risk assessment have continuous values (or multiple values), in order to determine whether to perform risk management or determine what level of actions need to be performed, it is necessary to set one or more decision-making critical values for the features having continuous values. For example, if the considered feature is a "total amount being transferred out," and the corresponding processing measure is "require the customer to enter the verification code received by the mobile phone when the transferred amount exceeds $t, and otherwise directly transfer the amount by a payment password." Here, the "$t" is the decision-making critical value for the "total amount being transferred out" feature.

On the other hand, from the perspective of the design of the complete risk management system, a plurality of assessment indexes often need to be considered. When a decision-making critical value is changed, a plurality of indexes may be affected at the same time. For example, the design direction of a risk management system is "a high prediction coverage and a low customer interruption rate." It may be understood that for the "total amount currently transferred" feature, a low decision-making critical value will improve not only the prediction coverage, but also the customer interruption rate. It is obvious that the plurality of indexes affected by a critical value should be comprehensively considered when the critical value is configured. In a large risk management system, more features may often be considered in order to determine a plurality of critical values. This further increases the implementation difficulty.

In this application, a solution for determining critical values in a risk management decision-making process is provided. It is used to determine a better combination of critical values in a "multiple-critical-value and multiple-index-value" risk management system.

Figure 1:
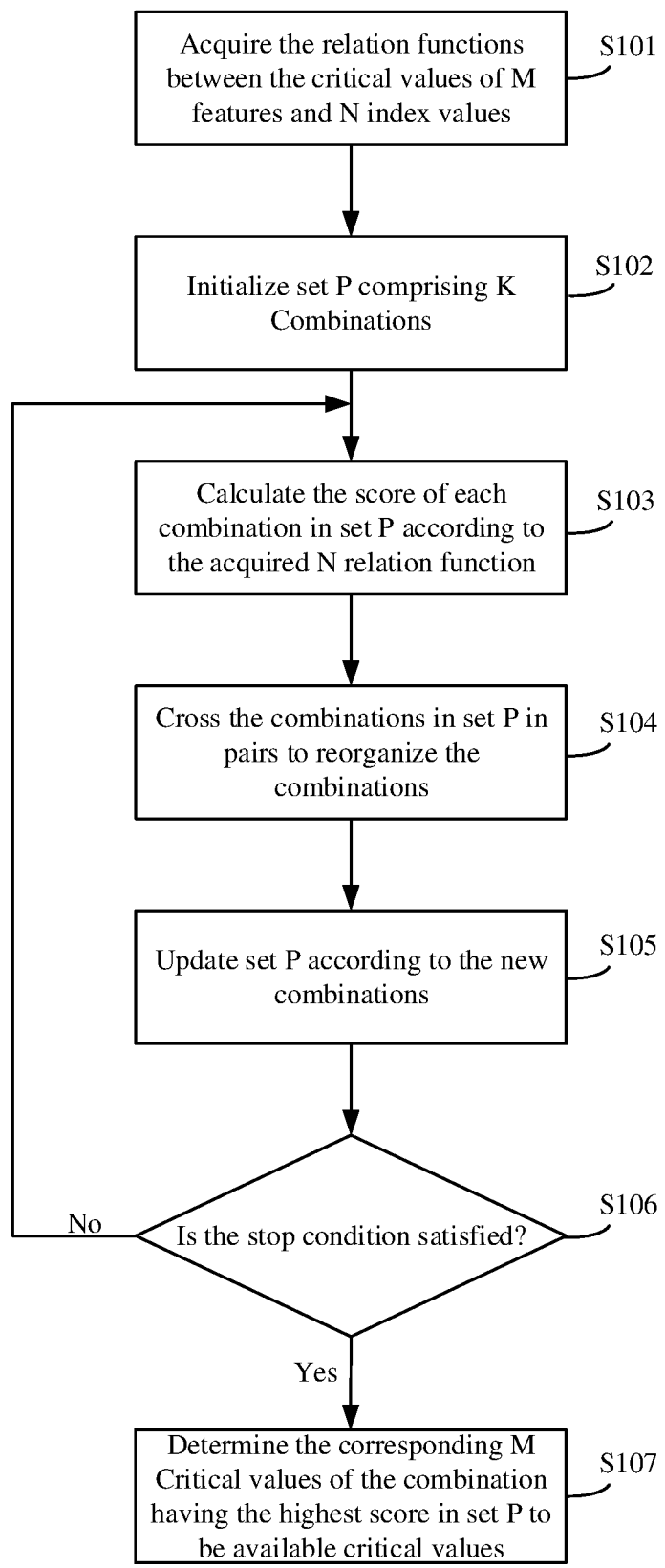
FIG. 1 is a flowchart of the method for determining critical values in a risk management decision-making process in the embodiments of the specification.

As shown in FIG. 1, the method comprises the following steps.

In S101, the method include acquiring the relation functions between the M features (i.e. the critical values of the M features) and N index values. In some embodiments of the specification, a system is first modeled as follows: N risk management indexes (for example, prediction coverage, prediction hit rate and customer interruption rate) exist, and are denoted by $y_1, y_2, \ldots y_N$; M decision-making critical values are set for M features (for example, a total amount being transferred out, a total amount transferred out within 24 hours, time interval from current login to the last secure operation, and a risk score of current transfer), respectively, and are denoted by $x_1, x_2, \ldots x_M$.

Figure 2:
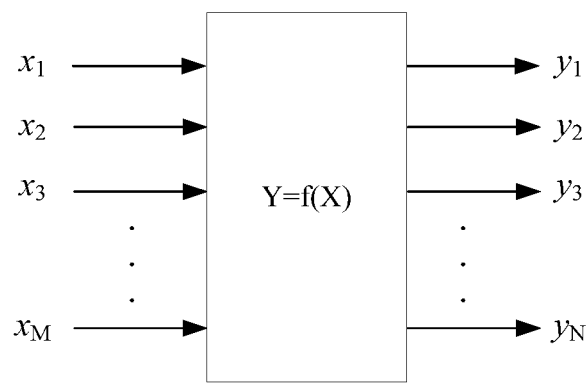
FIG. 2 shows the function relation in the embodiments of the specification.

It may be understood that relations exist between the M features and the index values. Since each index value is affected by all or some of the M features, a relation function may be established between each index value and a plurality of features $(x_1, x_2, \ldots x_M)$: $y_1=f_1(x_1, x_2, \ldots x_M)$, $y_2=f_2(x_1, x_2, \ldots x_M)$, ..., $y_N=f_N(x_1, x_2, \ldots x_M)$. N index values may correspond to N relation functions. For each relation function, all or some of the critical values of the M features may be the input (if some of the critical values are the input, it may be understood that the effect of the other critical values on the function value is 0) and one index value may be the output. FIG. 2 shows the function relation.

In some embodiments, the relation functions f between the M features and the index values are often implicit, which may be mined from a large amount of historical data through a machine learning algorithm.

First, data of a plurality of correspondences comprising the critical values of the M features and the N index values may be obtained from historical data. For example, for the risk management measure that "requires the customer to enter the verification code received by the mobile phone when the transferred amount exceeds $t," the statistic values of prediction coverage and the customer interruption rate within a certain period of time after $t is set to 100, 200, 500 and so on may be acquired from the historical data. Then the acquired plurality of correspondences are used as samples to obtain the relation functions between M features and N index values through supervised learning.

The specific method for acquiring the relation functions between features and index values through training may be referred to other relevant literatures. No detail is given in the present application. The method for acquiring relation functions is not limited to the above-mentioned method. For the solution provided in the present application, the relation functions between features and index values may be considered as known information.

In S102, the method may include initializing a set P comprising K combinations. In the present application, data comprising M critical values corresponding to M features is referred as one combination, and when $x_1, x_2, \ldots x_M$ (e.g., M features) are respectively set to different values (e.g., critical values), different combinations may be obtained. At the initialization stage, an integer K may be preset and K combinations may be generated to form the set P. The K combinations in the set P may be expressed as follows:

Combination 1: $x_{11}, x_{21}, \ldots x_{M1}$

Combination 2: $x_{12}, x_{22}, \ldots x_{M2}$

...

Combination $k$: $x_{1k}, x_{2k}, \ldots x_{Mk}$

...

Combination $K$: $x_{1K}, x_{2K}, \ldots x_{Mk}$

Specific values of $x_1, x_2, \ldots x_M$ in each combination may be obtained according to the actual data, or may be randomly generated. Of course, "randomly generated" here can be based on the prerequisite that the values themselves are valid values. A range may be set for each type of critical values according to practical requirements. In addition, the value of K may be a single-digit number or two-digit number or three-digit number, and is not defined in the specification.

In S103, the method may include calculating the score of each combination in the set P according to the acquired N relation functions. The "score" parameter defined in the specification may be used to assess the quality of each combination of critical values so as to finalize the "best" combination of critical values. The quality of a "combination" may be more intuitively reflected by the corresponding N index values, and therefore, the "score" parameter may also refer to as a parameter used to assess the overall quality of the N indexes. Assuming that a score is denoted by z, then z may be expressed as the value determined by $y_1, y_2, \ldots y_N$, that is, a function g which satisfies $z=g(y_1, y_2, \ldots y_N)$ exists. Further, for any combination k ($k=1, 2, \ldots K$), the M critical values may be represented as $x_{1k}, x_{2k}, \ldots x_{Mk}$, the N index values may be $y_{1k}=f_1(x_{1k}, x_{2k}, \ldots x_{Mk})$ $y_{2k}=f_2(x_{1k}, x_{2k}, \ldots x_{Mk}), \ldots, yNk=f_N(x_{1k}, x_{2k}, \ldots x_{Mk})$, and the score may be $z_k=g(y_{1k}, y_{2k}, \ldots y_{Nk})$.

Since the above-mentioned function g is a function to comprehensively assess the overall quality of the N indexes, the basic requirements for the function are: the function is positively correlated to positive indexes of the N index values and negatively correlated to negative indexes of the N index values. Here, the positive indexes refer to "the larger the better" indexes, for example, a prediction hit rate and a prediction coverage, and the negative indexes (also called reverse indexes) refer to "the smaller the better" indexes, for example, a customer interruption rate.

In some embodiments, the score z may be calculated as a difference. For example, $z=\Sigma$ positive index values of N index values$-\Sigma$ negative index value of N index values, where "$\Sigma$" is a sum operator, that is, for a group of N indexes, "all positive index values minus all negative index values" is used to assess the overall quality of the N indexes, and the larger the value of z is, the better the group of indexes are.

In some embodiments, the score z may be calculated as a ratio. For example, $$z = \text{absolute}\left(\frac{\pi(\text{positive index values of } N \text{ index values})}{\pi(\text{negative index values of } N \text{ index values})}\right)$$

where, "$\pi$" is a product operator, that is, for a group of N indexes, the absolute value of "the ratio of all positive index values to all negative index values" is used to assess the overall quality of the N indexes, and the larger the value of z is, the better the group of indexes are.

It may be understood that the above functions are two examples for the function g. According to the actual requirements, the function may have other variants. For example, the weighting method may be used for the function in the form of a difference, that is, a correction factor is specified as a weight for each index value.

If the priorities of different index values are predefined, a fixed correction factor may be specified for each index value. These correction factors may be obtained through machine learning of historical data, or may be manually allocated (for example, a correction factor with a larger absolute value may be specified for an important index).

If the priorities of different index values cannot be predefined, correction factors may be randomly generated as weights for the N index values, respectively, and then the corrected N index values are weighted. During cyclic processing, different correction factors may be randomly generated in each cycle, and the best (or approximately the best) correction factor combination may be adaptively selected through a plurality of cyclic selections.

In some embodiments, the score of each combination may be corrected according to the overall distribution of the K combinations. The principle may be that the denser the distribution points are, the larger the penalty correction factors may be given to the corresponding scores. For example, if the M features are mapped into an M-dimension space, then the K combinations may be mapped into K points in the space. For point k ($k=1, 2, \ldots K$), if other points are distributed around, a penalty correction is made for the score $z_k$ and the penalty correction factor is positively correlated to the number of the other points distributed around. For example, the penalty correction formula may be set to $$z'_k = \frac{z_k}{\text{number of other points around point } k \text{ within the radius } R},$$

where R is a preset value, for example, a Euclidean distance in the M-dimension space. The correction formula is only used as an exemplary description and should not be interpreted as a restriction of the solution in the present application.

In addition, the execution sequence of steps S101 and S102 is not restricted as long as they are completed before step S103.

In S104, the method may include crossing the combinations in set P in pairs to reconstruct the combinations.

In some embodiments, "crossing the combinations in pairs to reconstruct the combinations" means selecting two combinations from the K combinations in set P and exchanging any critical values to generate two new combinations. For example, for the following two combinations:

Combination 1: $x_{11}, x_{21}, \ldots x_{M1}$
Combination 2: $x_{12}, x_{22}, \ldots x_{M2}$ if the first critical values ($x_{11}$ and $x_{12}$) are exchanged, two new combinations may be obtained:

New combination 1: $x_{12}, x_{21}, \ldots x_{M1}$
New combination 2: $x_{11}, x_{22}, \ldots x_{M2}$ The above-mentioned process may be repeated, where two combinations are selected from set P each time, and random critical values are exchanged to generate two new combinations. After a plurality of cycles, a set consisting of new combinations may be generated. The new set is denoted by P' in the present application.

The following points may be noted in the above-mentioned cyclic process. Firstly, a combination in the original set P may be selected for multiple times or may be never selected in the cyclic process. In the solution provided in the present application, the probability of any combination k ($k=1, 2, \ldots K$) being selected may be positively correlated to the score $z_k$ thereof.

In some embodiments, "the probability of a combination k being selected may be positively correlated to the score $z_k$ thereof" may be implemented by the following steps: calculate the sum $\Sigma z_k$ of the scores of the K combinations in set P, and determine the ratio of $z_k$ to $\Sigma z_k$ to be the probability of the combination k being selected each time.

For example, if the scores of combinations 1 to 4 are 10, 20, 20 and 40, respectively, then the probabilities of combinations 1 to 4 being selected each time are: 10/90, 20/90, 20/90 and 40/90, respectively.

In some embodiments, an improvement of the above-mentioned algorithm or other algorithms may be adopted to achieve "the probability of a combination k being selected may be positively correlated to the score $z_k$ thereof." For example, the softmax function may be used to calculate the probability of the combination k being selected. The prerequisite is that the algorithm satisfies the principle of "the larger $z_k$ is, the higher the probability of combination k being selected is." The corresponding realistic meaning of the principle is as follows: the larger $z_k$ is, the more "superior" the M critical values in combination k are; such critical values should have higher probabilities of being selected to participate cross the reconstructions, thus helping to generate more superior combinations.

Secondly, the exchanged object for each recombination may be any of the M critical values (the first critical value is exchanged in the above-mentioned example). The exchanged object may be randomly selected or determined according to a certain polling algorithm at each exchange. The general principle is that critical values in different positions all have a chance to be selected to participate in cross recombination so as to cover more comprehensive combinations in the cyclic process.

Thirdly, after an exchange is completed each time, the exchanging results may be randomly corrected. For example, the values of the exchanged objects in the exchanging results in the above example may be randomly corrected and thus the new combinations are corrected into:

New combination 1: $0.9*x_{12}, x_{21}, \ldots x_{M1}$

New combination 2: $1.1*x_{11}, x_{22}, \ldots x_{M2}$

Where, 0.9 and 1.1 are randomly generated correction factors. The purpose of such process is to avoid restriction of the initialized set P and attempt to generate new "superior critical values." A random correction may be a random correction of an exchanged object, or a random correction of other critical values than the exchanged object. The algorithm for a random correction is not limited to "multiplication by a factor," and those skilled in the art may flexibly select a specific random correction scheme according to the practical requirements. In addition, a certain random correction probability may be set after each exchange. For example, if the initialized set P contains a small number of combinations, a high random correction probability may be set.

Finally, the stop condition of the above-mentioned cyclic process may be: the number of new combinations (namely, the number of combinations in set P') reaches a preset number. For the convenience of processing, the "preset number" may usually be set to K, and of course, to other values, for example, K−2, 2K, 3K, etc.

In S105, the method may include updating set P according to the new combinations.

Since set P needs to participate in the processing in each cyclic process, the number of combinations in set P before and after the update should remain unchanged. In some embodiments, the following updating method may be adopted: if the number of new combinations in step S104 is K, K new combinations (namely, set P') may be directly determined to be set P after the update. This is because set P' itself is formed by recombining superior critical values in set P. Therefore, set P' should be superior to set P as a whole. That is, the combinations tend to be the better after each update, and the best (or the approximately best) combinations of critical values may be found after a plurality of cycles.

It may be understood that if the number of new combinations in step S104 is greater than K, the scores of the new combinations may be calculated. The new combinations may be sorted by the scores, and K combinations having the highest scores may be determined to be set P after the update. For the method for calculating the scores of combinations, step S103 may be referred.

In addition, after K combinations in the original set P and the new combinations are merged (that is, P and V are merged), the combinations may be sorted by score and K combinations having the highest scores may be determined to be set P after the update. Since the exchanged object for each recombination is randomly selected, superior combinations in the original set P may be discarded during the selection. The merged updating method may effectively avoid this case.

In S106, the method may include determining whether the stop condition of the cyclic process is satisfied. If yes, continue to perform step S107, and otherwise, go back to step S103.

From the flowchart in FIG. 1, it may be seen that steps S103 to S105 are cyclic processing steps. The stop condition of the cyclic process may be set in different ways. The following only gives an exemplary description.

In some embodiments, the cyclic process may be stopped after the number of cycles reaches a preset number (for example, 5, 10, or 50).

In some embodiments, the cyclic process may be stopped after the highest combination score in set P already satisfies a preset condition of convergence. For example, if the change of the highest combination score in set P obtained after two cycles is already less than a threshold, the optimal solution may be considered as found.

In some embodiments, the cyclic process may be stopped after the corresponding N index values of any combination in set P already satisfy the requirements. For example, if the system design requirements are a customer interruption rate below 1% and a prediction coverage above 90%, and if combinations (possibly one or more) of critical values satisfying the indexes are obtained after a cycle is completed, then the cyclic process may not continue even though the combinations may be further optimized in this case.

If the stop condition of the cyclic process is not satisfied, go back to step S104, and use the set P obtained after the current update as the initial set P of the next cycle and perform steps S103 to S105 again. If the stop condition of the cyclic process is satisfied, perform step S107.

In S107, the method may include determining the corresponding M critical values of the combination having the highest score in set P to be candidate critical values.

In the solution provided in the present application, steps S103 to S105 are utilized for cyclic processing, and new combinations of critical values are continuously generated by crossing the combinations of critical values for a plurality of times. Since the principle of "the higher the score is, the higher the probability of being selected is" is observed in the recombination process, the combinations of critical values continuously tend to be better in the way of "survival of the fittest," and thus the best (or the approximately best) combinations of critical values may be efficiently found.

Figure 3:
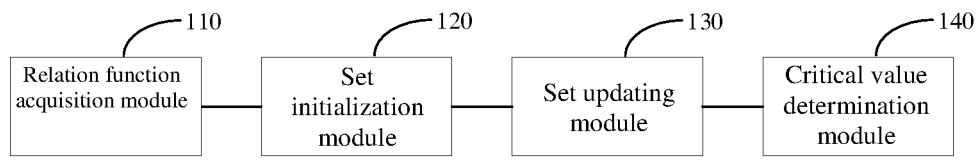
FIG. 3 shows a block diagram of the apparatus for determining critical values in a risk management decision-making process in the embodiments of the specification.

Corresponding to the embodiment of the above-mentioned method, the embodiments of the specification further provide an apparatus for determining critical values in a risk management decision-making process. As shown in FIG. 3, the apparatus may comprise: a relation function acquisition module 110, configured to acquire the relation functions between M features and N index values, wherein each index value corresponds to one relation function, all or some of the M features are input and one index value is output for each relation function; a set initialization module 120, configured to initialize set P comprising K combinations, each combination consisting of M critical values corresponding to the M features and K being a preset value; a set updating module 130, configured to utilize the following sub-modules (not shown) for cyclic processing until a preset stop condition is satisfied; a score calculation sub-module, configured to calculate the score of each combination in set P according to the acquired N relation functions, the score being used to represent the overall quality of N index values of the corresponding combination (e.g., feeding the M critical values in a combination into the N relation functions, each of the N relation functions generates one index value) and being positively correlated to the positive index values of N index values and negatively correlated to the negative index values of N index values; a recombination sub-module, configured to select two combinations from set P each time and exchange any critical value to generate two new combinations until the number of new combinations reaches a preset number, wherein the probability of each combination being selected from set P is positively correlated to the score of the combination; an updating sub-module, configured to update set P according to the new combinations, the number of combinations in set P after updating remaining unchanged; and a critical value determination module 140, configured to determine the corresponding M critical values of the combination having the highest score in set P to be available critical values after cyclic processing is stopped.

In some embodiments, the relation function acquisition module 110 may be configured to: acquire a plurality of correspondences comprising M features and N index values from historical data, and use the acquired plurality of correspondences as samples to obtain the relation functions between the M features and the N index values through training.

In some embodiments, the score calculation sub-module may be configured to: calculate the score of the combination according to the following formula: Σ positive index values of N index values–Σ negative index value of N index values.

In some embodiments, the score calculation sub-module may be configured to: generate a random correction factor for N index values, respectively, and calculate the score of the combination according to the corrected N index values.

In some embodiments, the recombination module 130 may determine the probability of each combination being selected from set P in the following way: calculate the sum of the scores of K combinations in set P, and determine the ratio of the score of each combination to the sum of the scores to be the probability of the combination being selected.

In some embodiments, the recombination module may be configured to: randomly correct the exchanged results to generate two new combinations after selecting two combinations from set P each time and exchanging any critical value.

In some embodiments, the updating sub-module may be configured to: sort the new combinations by score and determine K combinations having the highest scores to be set P after updating; or merge K combinations in the original set P and the new combinations, and sort the combinations by score and determine K combinations having the highest scores to be set P after updating.

The embodiments of the specification further provide a computer device, which at least comprises a memory, a processor and a computer program stored in the memory and capable of running on the processor, wherein the processor realizes the above-mentioned method for determining critical values for a decision-making process in a risk management when executing the program. The method may comprise: acquiring the relation functions between M features and N index values, wherein each index value corresponds to one relation function, all or some of the M features are input and one index value is output for each relation function, initializing set P comprising K combinations, each combination consisting of M critical values and K being a preset value, and utilizing the following steps for cyclic processing until a preset stop condition is satisfied: calculating the score of each combination in set P according to the acquired N relation functions, the score being used to represent the overall quality of N index values of the corresponding combination and being positively correlated to the positive index values of N index values and negatively correlated to the negative index values of N index values, selecting two combinations from set P each time and exchanging any critical value to generate two new combinations until the number of new combinations reaches a preset number, wherein the probability of each combination being selected from set P is positively correlated to the score of the combination, and updating set P according to the new combinations, the number of combinations in set P after updating remaining unchanged, and determining the corresponding M critical values of the combination having the highest score in set P to be available critical values.

Figure 4:
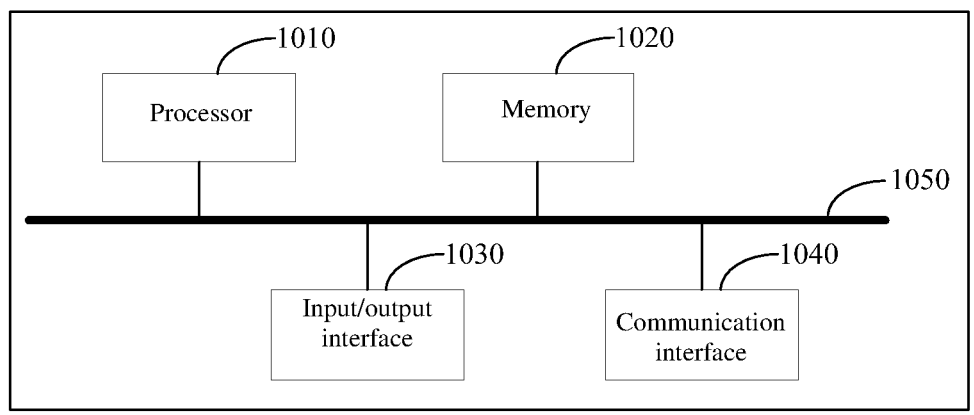
FIG. 4 shows a structure of a device for configuring the apparatus in the embodiments of the specification.

FIG. 4 shows a hardware structure of a specific computer device provided by the embodiments of the specification. The device may comprise a processor 1010, a memory 1020, an input/output interface 1030, a communication interface 1040 and a bus 1050. The processor 1010, memory 1020, input/output interface 1030 and communication interface 1040 realize communication connections between them in the device through the bus 1050.

The processor 1010 may be a general-purpose central processing unit (CPU), microprocessor, application specific integrated circuit (ASIC) or one or more integrated circuit and is used to execute a related program to realize the technical solution provided in the embodiments of the specification.

The memory 1020 may be a read-only memory (ROM), random access memory (RAM), static storage device or dynamic storage device. The memory 120 may store an operating system and other applications. When the technical solution provided in the embodiments of the specification is realized by software or firmware, related program codes are stored in the memory 1020 and are invoked by the processor 1010 to execute.

The input/output interface 1030 is used to connect an input/output module to realize information input and output. The input/output module may be configured as a component (not shown) in the computer device or may be externally connected to the computer device to provide the corresponding function. The input devices may include a keyboard, a mouse, a touch screen, a microphone and various sensors, and the output devices may include a monitor, a loudspeaker, a vibrator and an indicator.

The communication interface 1040 is used to connect the communication module (not shown) to realize communication interactions between the computer device and other devices. The communication module may realize communication in wired mode (for example, USB and network cable) or wireless mode (for example, mobile network, Wi-Fi and Bluetooth). The bus 1050 comprises a path and transmits information between different components (for example, the processor 1010, the memory 1020, the input/output interface 1030 and the communication interface 1040) of the computer device.

Although only the processor 1010, the memory 1020, the input/output interface 1030, the communication interface 1040 and the bus 1050 of the computer device are shown, the computer device may further comprise other components necessary for the normal operation during the specific implementation. In addition, those skilled in the art may understand that the computer device may comprise only the components required to realize the solution in the embodiments of the specification, and unnecessarily comprise all the components shown in the figure.

The embodiments of the specification further provide a computer-readable storage medium. A computer program is stored in the computer-readable storage medium and the program realizes the method for determining critical values in a risk management decision-making process when executed by the processor. The method may comprises: acquiring the relation functions between M features and N index values, wherein each index value corresponds to one relation function, all or some of the M features are input and one index value is output for each relation function, initializing set P comprising K combinations, each combination consisting of M critical values and K being a preset value, and utilizing the following steps for cyclic processing until a preset stop condition is satisfied: calculating the score of each combination in set P according to the acquired N relation functions, the score being used to represent the overall quality of N index values of the corresponding combination and being positively correlated to the positive index values of N index values and negatively correlated to the negative index values of N index values, selecting two combinations from set P each time and exchanging any critical value to generate two new combinations until the number of new combinations reaches a preset number, wherein the probability of each combination being selected from set P is positively correlated to the score of the combination, and updating set P according to the new combinations, the number of combinations in set P after updating remaining unchanged, and determining the corresponding M critical values of the combination having the highest score in set P to be available critical values.

Computer-readable media include volatile and nonvolatile media and mobile and immobile media, and they may realize information storage by use of any method or technique. Information may be computer-readable commands, data structures, modules of a program or other data. Examples of storage media of a computer include but are not limited to phase-change RAM (PRAM), static random access memory (SRAM), dynamic random access memory (DRAM), other types of random access memory (RAM), read-only memory (ROM), electrically erasable programmable read-only memory (EEPROM), flash memory or other memory techniques, compact disk read-only memory (CD-ROM), digital versatile disk (DVD), cassette tape, magnetic tape, magnetic disk or other storage device or any other non-transmission medium, and they may be used to store information which may be accessed by a computer device. According to the definition in this document, computer-readable media excludes transitory media, for example, modulated data signals and carriers.

From the description of the above-mentioned embodiments, it may be learned that those skilled in the art may clearly understand that the embodiments of the specification may be implemented with the aid of software and a required general-purpose hardware platform. On the basis of the understanding, the technical solution provided in the embodiments of the specification or the part of the technical solution which has made contributions to the existing solutions may be essentially embodied in the form of a software product. The computer software product may be stored in a storage medium, such as ROM/RAM, disk, optical disk, comprise a plurality of commands and are used to enable a computer device (a PC, a server or a network device) to execute the method described in all or some embodiments of the specification.

The system, apparatus, modules or units described in the embodiments above may be realized by a computer chip or entity, or realized by a product having a function. A typical device is a computer, and the specific form of the computer may be a personal computer, a laptop computer, a cellular phone, a camera phone, a smart phone, a personal digital assistant, a media player, a navigation device, an e-mail device, a game console, a tablet computer, a wearable device or any combination of these devices.

The embodiments in the description are described in a progressive way. For the same or similar parts between the embodiments, refer to these embodiments. Each embodiment focuses the differences from the others. In particular, the description of the embodiments of the apparatus is simple because they are similar to the embodiments of the method. For the related parts, see the description of the embodiments of the method. The above-mentioned embodiments of the apparatus are given only for the exemplary purpose, wherein the modules described as separate components may or cannot be physically separated, and the functions of all modules may be realized in one or more pieces of software/hardware when the solution in the embodiments of the specification is implemented. Part or all of the modules may be selected to realize the solution in the embodiments according to the actual requirement. Those skilled in the art may understand and implement the solution without any creative work.

Only specific embodiments of the specification are described above. It should be noted that those skilled in the art may make improvements and modifications without departing from the principle of the specification and these improvements and modifications should also fall within the scope of protection of the embodiments of the specification.

What is claimed is:
1. A computer-implemented method for determining critical values for a risk management system, comprising:
  obtaining N relation functions between M features and N index values, wherein each of the M features is a feature of a funds transfer from a financial account of a customer, the features comprising a total amount being transferred out of the account by the funds transfer, and wherein the N index values represent at least one of prediction coverage, prediction hit rate, and customer interruption rate, wherein:
    each of the N index values corresponds to one of the N relation functions, and
    each of the N relation functions takes one or more of the M features as input, and one of the N index values as output;
  generating a set P comprising K combinations, each combination comprising M critical values of the M features, K being a preset value;
  cyclically executing a sequence of optimizing instructions a preset number of times, the sequence of optimizing instructions comprising:
    determining K scores respectively for the K combinations based on the N relation functions, wherein each score represents an overall quality of the N index values corresponding to the combination associated with the each score, and is positively correlated to positive index values of the N index values and negatively correlated to negative index values of the N index values,
    selecting, a highest score from the determined K scores,
    retrieving, from a memory, a stored highest score from a last cycle,
    determining whether a difference between the selected highest score and the stored highest score from the last cycle is below a preset threshold, if the difference is below the preset threshold, terminating the cyclically executing the sequence of optimizing instructions, storing the highest score into the memory, and repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations;

when the cyclically executing the sequence of optimizing instructions is terminated, reconfiguring the risk management system by:

determining the M critical values in a combination with a highest score in the set P to be candidate critical values, and respectively associating the M features of the risk management system with the M candidate critical values;

responsive to reconfiguring the risk management system, selectively initiating an action for the funds transfer from the financial account of the customer based on the M candidate critical values, wherein the action comprises transmitting a message comprising a verification code to a mobile phone of the customer over a communication network, the message requiring the customer to enter the verification code on an interface of a computing device; and responsive to receiving the verification code from the computing device over the communication network, causing the total amount to be transferred out of the financial account of the customer.

2. The method as claimed in claim 1, wherein the obtaining N relation functions between M features and N index values comprises:

obtaining a plurality of correspondences comprising critical values of the M features and the N index values from historical data; and training the N relation functions between the M features and the N index values based on the plurality of correspondence.

3. The method as claimed in claim 1, wherein the determining K scores respectively for the K combinations based on the N relation functions comprises:

calculating each score by (Σ the positive index values of the corresponding N index values–Σ the negative index values of the corresponding N index values), wherein Σ represents a summation operation.

4. The method as claimed in claim 1, wherein the determining K scores for the K combinations based on the N relation functions further comprises, for each of the K scores:

generating N random correction factors for the corresponding N index values; and calculating the score based on the N random correction factors and the corresponding N index values.

5. The method as claimed in claim 1, wherein the probability for each of the K combinations being selected from the set P is determined by:

obtaining a summation of the scores of the K combinations in the set P; and determining a ratio of the score of each of the K combinations to the summation of the scores as the probability of the each combination being selected.

6. The method as claimed in claim 1, wherein the selecting two combinations from the set P and exchanging one or more critical values between the two combinations to generate two new combinations comprises:

after exchanging one or more critical values between the two combinations, randomly correcting the two exchanged combinations to generate the two new combinations.

7. The method as claimed in claim 1, wherein the updating the set P according to the new combinations comprises:

sorting the new combinations by the corresponding scores; and selecting K of the new combinations having the highest scores to form a new set P.

8. The method as claimed in claim 1, wherein the updating the set P according to the new combinations further comprises:

merging the K combinations in the set P and the new combinations in the updated set P;

sorting the merged combinations by the corresponding scores; and selecting K of the merged combinations having the highest scores to form a new set P.

9. A system for determining critical values in risk management, comprising one or more processors and one or more non-transitory computer-readable memories coupled to the one or more processors and configured with instructions executable by the one or more processors to cause the system to perform operations comprising:

obtaining N relation functions between M features and N index values, wherein each of the M features is a feature of a funds transfer from a financial account of a customer, the features comprising a total amount being transferred out of the account by the funds transfer, and wherein the N index values represent at least one of prediction coverage, prediction hit rate, and customer interruption rate, wherein:

each of the N index values corresponds to one of the N relation functions, and each of the N relation functions takes one or more of the M features as input, and one of the N index values as output;

generating a set P comprising K combinations, each combination comprising M critical values of the M features, K being a preset value;

cyclically executing a sequence of optimizing instructions a preset number of times, the sequence of optimizing instructions comprising:

determining K scores respectively for the K combinations based on the N relation functions, wherein each score represents an overall quality of the N index values corresponding to the combination associated with the each score, and is positively correlated to positive index values of the N index values and negatively correlated to negative index values of the N index values;

selecting, a highest score from the determined K scores, retrieving, from a memory, a stored highest score from a last cycle, determining whether a difference between the selected highest score and the stored highest score from the last cycle is below a preset threshold, if the difference is below the preset threshold, terminating the cyclically executing the sequence of optimizing instructions, storing the highest score into the memory, and repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations;

when the cyclically executing the sequence of optimizing instructions is terminated, reconfiguring the risk management system by:

determining the M critical values in a combination with a highest score in the set P to be candidate critical values, and respectively associating the M features of the risk management system with the M candidate critical values;

responsive to reconfiguring the risk management system, selectively initiating an action for the funds transfer from the financial account of the customer based on the M candidate critical values, wherein the action comprises transmitting a message comprising a verification code to a mobile phone of the customer over a communication network, the message requiring the customer to enter the verification code on an interface of a computing device; and responsive to receiving the verification code from the computing device over the communication network, causing the total amount to be transferred out of the financial account of the customer.

10. The system of claim 9, wherein the obtaining N relation functions between M features and N index values comprises:

obtaining a plurality of correspondences comprising critical values of the M features and the N index values from historical data; and training the N relation functions between the M features and the N index values based on the plurality of correspondence.

11. The system of claim 9, wherein the determining K scores for the K combinations based on the N relation functions comprises:

calculating each score by ($\Sigma$ the positive index values of the corresponding N index values–$\Sigma$ the negative index values of the corresponding N index values), wherein $\Sigma$ represents a summation operation.

12. The system of claim 9, wherein the determining K scores for the K combinations based on the N relation functions further comprises, for each of the K scores:

generating N random correction factors for the corresponding N index values; and calculating the score based on the N random correction factors and the corresponding N index values.

13. The system of claim 9, wherein the probability for each of the K combinations being selected from the set P is determined by:

obtaining a summation of the scores of the K combinations in the set P; and determining a ratio of the score of each of the K combinations to the summation of the scores as the probability of the each combination being selected.

14. The system of claim 9, wherein the selecting two combinations from the set P and exchanging one or more critical values between the two combinations to generate two new combinations comprises:

after exchanging one or more critical values between the two combinations, randomly correcting the two exchanged combinations to generate the two new combinations.

15. The system of claim 9, wherein the updating the set P according to the new combinations further comprises:

merging the K combinations in the set P and the new combinations in the updated set P;

sorting the merged combinations by the corresponding scores; and selecting K of the merged combinations having the highest scores to form a new set P.

16. A non-transitory computer-readable storage medium for determining critical values in risk management, the storage medium configured with instructions executable by one or more processors to cause the one or more processors to perform operations comprising:

obtaining N relation functions between M features and N index values, wherein each of the M features is a feature of a funds transfer from a financial account of a customer, the features comprising a total amount being transferred out of the account by the funds transfer, and wherein the N index values represent at least one of prediction coverage, prediction hit rate, and customer interruption rate, wherein:

each of the N index values corresponds to one of the N relation functions, and each of the N relation functions takes one or more of the M features as input, and one of the N index values as output;

generating a set P comprising K combinations, each combination comprising M critical values of the M features, K being a preset value;

cyclically executing a sequence of optimizing instructions a preset number of times, the sequence of optimizing instructions comprising:

determining K scores respectively for the K combinations based on the N relation functions, wherein each score represents an overall quality of the N index values corresponding to the combination associated with the each score, and is positively correlated to positive index values of the N index values and negatively correlated to negative index values of the N index values, selecting, a highest score from the determined K scores, retrieving, from a memory, a stored highest score from a last cycle, determining whether a difference between the selected highest score and the stored highest score from the last cycle is below a preset threshold, if the difference is below the preset threshold, terminating the cyclically executing the sequence of optimizing instructions, storing the highest score into the memory, and repeatedly selecting two combinations from the set P and exchanging one or more critical values between the two combinations to generate two new combinations until a quantity of the new combinations reaches a preset number, wherein a probability for each of the K combinations being selected from the set P is positively correlated to the score of the each combination; and updating the set P by selecting K combinations from the new combinations;

when the cyclically executing the sequence of optimizing instructions is terminated, reconfiguring the risk management system by:

determining the M critical values in a combination with a highest score in the set P to be candidate critical values, and respectively associating the M features of the risk management system with the M candidate critical values;

responsive to reconfiguring the risk management system, selectively initiating an action for the funds transfer from the financial account of the customer based on the M candidate critical values, wherein the action comprises transmitting a message comprising a verification code to a mobile phone of the customer over a communication network, the message requiring the customer to enter the verification code on an interface of a computing device; and responsive to receiving the verification code from the computing device over the communication network, causing the total amount to be transferred out of the financial account of the customer.

17. The storage medium of claim 16, wherein the obtaining N relation functions between M features and N index values comprises:

obtaining a plurality of correspondences comprising critical values of the M features and the N index values from historical data; and training the N relation functions between the M features and the N index values based on the plurality of correspondence.

18. The storage medium of claim 16, wherein the determining K scores for the K combinations based on the N relation functions comprises:

calculating each score by ($\Sigma$ the positive index values of the corresponding N index values–$\Sigma$ the negative index values of the corresponding N index values), wherein $\Sigma$ represents a summation operation.

19. The storage medium of claim 16, wherein the updating the set P according to the new combinations further comprises:

merging the K combinations in the set P and the new combinations in the updated set P;

sorting the merged combinations by the corresponding scores; and selecting K of the merged combinations having the highest scores to form a new set P.

20. The storage medium of claim 16, wherein the determining K scores for the K combinations based on the N relation functions further comprises, for each of the K scores:

generating N random correction factors for the corresponding N index values; and calculating the score based on the N random correction factors and the corresponding N index values.

* * * * *